June 1, 1965   M. BENGER   3,186,942
OXIDATION OF SULPHIDES IN AQUEOUS SOLUTIONS
Filed April 10, 1962
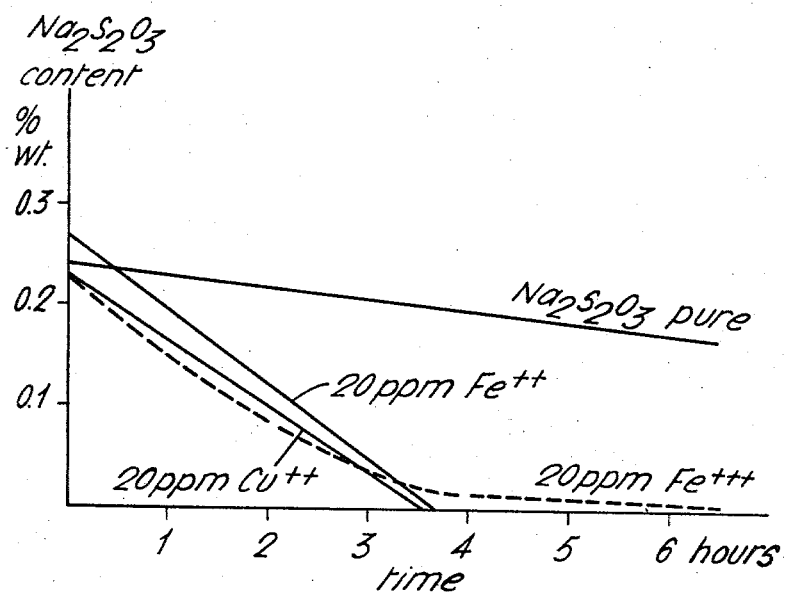
INVENTOR
MICHAEL BENGER
BY
Morgan, Finnegan, Durham & Pine
ATTORNEYS

3,186,942
OXIDATION OF SULPHIDES IN AQUEOUS SOLUTIONS
Michael Benger, London, England, assignor to The British Petroleum Company Limited, London, England, a British joint-stock corporation
Filed Apr. 10, 1962, Ser. No. 186,537
Claims priority, application Great Britain, Apr. 19, 1961, 14,122/61
13 Claims. (Cl. 210—63)

This invention relates to the oxidation of sulphides in aqueous solutions.

Certain chemical processes result in the production of noxious effluents containing quantities of sulphides in solution, usually spent alkaline wash liquors such as those obtained in petroleum refineries. The disposal of such untreated effluents presents considerable problems since strict limits are commonly applied to the maximum permissible sulphide concentration in effluents which are to be discharged into rivers or other waterways. The maximum permissible sulphide concentration may be as less than 1 part per million.

For this reason it is often necessary to eliminate the sulphide from the effluents. Elimination may be achieved by means of an oxidation process whereby sulphides are converted to thiosulphates, which, in effluents, are less objectionable constituents. However, the thiosulphate is still capable of taking up oxygen and this is a disadvantage when the treated effluent is to be passed to a biological oxidation plant since the consumption of oxygen in that plant is considerably increased. Thiosulphate, by reason of its oxygen demands, is also an undesirable contaminant if passed direct to a river. It has now been discovered that the sulphides may be largely converted into sulphate if the oxidation is carried out in the presence of a small quantity of certain catalysts.

According to the invention therefore, a process for the treatment of aqueous solutions containing sulphides, particularly petroleum refinery effluent, comprises contacting the aqueous solution with oxygen or a gas mixture containing free oxygen, preferably air, at elevated temperature in the presence of a small quantity of a catalyst consisting essentially of a compound of copper or an iron group metal.

Cupric, ferrous and ferric compounds are particularly suitable for the purposes of the present invention and chlorides are preferred. The use of iron salts may be preferred in installations largely comprising iron or steel pipework since the use of copper salts in such installations may under certain conditions bring about corrosion. The catalysts are preferably used in the form of aqueous solutions and preferably the pH values of the catalyst solutions are adjusted so that they are slightly alkaline, for example between 7 and 9 or higher. This may be achieved for example by treatment with caustic alkali solution.

The sulphide-containing solution is preferably contacted with catalyst under moderately elevated conditions of temperature and pressure, for example a temperature within the range 95–135° C., preferably above 100° C., suitably within the range 105–130° C., and a pressure sufficient to maintain liquid phase conditions, preferably 0–50 p.s.i.g. Sufficient oxygen-containing gas is contacted with the solution to provide an excess of free oxygen over the stoichiometric quantity required to oxidise the sulphide in the solution, for example between 1 and 5 times, preferably 3 to 4 times, the stoichiometric quantity. The reaction time for complete oxidation of sulphide to sulphate decreases with increasing severity of process conditions i.e. with increasing temperature, pressure and oxygen flow rate. Preferably the catalyst is contacted with solution at a rate sufficient to bring about substantially complete oxidation of sulphide to sulphate, this being readily determinable by experiment. Effluent waters may contain up to 15% weight of sulphide or more but generally speaking the sulphide content will be less than 5% weight. Generally speaking, sufficient catalyst to provide between 10 and 1000 parts of metal per million parts of solution, preferably 30–100 p.p.m., will be adequate.

The process of the invention is illustrated by the following examples.

*Example 1*

Spent caustic solution arising from various processing units in a petroleum refinery was passed to a tower in which it was contacted with air in the presence of small amounts of copper chloride injected into the caustic feed tank.

The conditions employed and the results obtained are set out in the following table.

| Experiment No. | 1 | 2 |
|---|---|---|
| Throughput gal./h. (m.³/h.) | 4,300(16.3) | 8,150(30.8) |
| Inlet temperature, ° F. (° C) | 284(140) | 266(130) |
| Air, s.c.f.m. (N m.³/h.) | 218(350) | 280(450) |
| Pressure, p.s.i. (kg./cm.²) | 57(4.0) | 57(4.0) |
| Residence time, min | 90 | 50 |
| Wt. percent S-- in feed | 0.023 | 0.048 |
| Na₂S₂O₃ in product, wt. percent | Neg. | Neg. |
| Na₂SO₄ in product, wt. percent | 0.250 | 0.240 |
| Conversion to sulphate sulphur, percent | 100 | 100 |
| Injected copper in feed tank, mg. Cu/l. (p.p.m.) | 40 | 20 |
| Effective copper in feed, mg. Cu/l. (p.p.m.) | 9 | 8.9 |
| Effective copper in product, mg. Cu/l. (p.p.m.) | 0.12 | 1.8 |

Experiment No. 1 was repeated but without adding any copper chloride to the feed tank when it was found that the oxidised caustic contained 0.28% wt. sodium thiosulphate and 0.120% wt. sodium sulphate so that the conversion to sulphate was only 72.3%.

*Example 2*

Refinery effluent water was contacted with different quantities of cupric chloride catalyst under the following conditions:

Temperature _____ 100° C.
Pressure _____ 34 lbs./sq. in.
Air rate _____ 110 m.³/h.
Input _____ 9 m.³/h.
Residence time _____ 3.6 hrs.

The effect of increasing the amount of catalyst in the oxidation reaction is shown in the following table:

| Cu, p.p.m. | | NaOH, percent wt. | Na₂S, percent wt. S | RSH, percent wt. S | Na₂S₂O₃, percent wt. S | Na₂SO₄, percent wt. S |
|---|---|---|---|---|---|---|
| 10 | Inlet | 0.015 | 0.065 | 0.005 | Traces | Neg. |
|  | Outlet | 0.063 | Neg. | Neg. | 0.021 | 0.042. |
| 20 | Inlet | 0.080 | 0.064 | 0.004 | Traces | Neg. |
|  | Outlet | 0.109 | Neg. | Neg. | 0.018 | 0.048. |
| 30 | Inlet | 0.028 | 0.069 | 0.007 | Traces | Neg. |
|  | Outlet | 0.046 | Neg. | Neg. | Traces | 0.063. |

It is seen that using 30 p.p.m. of catalyst substantially complete oxidation is achieved.

Example 3

Three different samples of refinery effluent water were contacted with cupric chloride catalyst under the following conditions:

Temperature _____ 100° C.
Pressure _____ 34 lbs./sq. in.
Residence time _____ 4.6 hrs.
$Cu^{++}$ concentration _____ 30 p.p.m.

Results as shown in the following table:

|  | $Na_2S$, percent wt. | $Na_2S$, percent wt. S | RSH, percent wt. | $Na_2S_2O_3$, percent wt. S | $Na_2SO_4$, percent wt. S |
|---|---|---|---|---|---|
| Feed____ | 0.231 | 0.095 | 0.003 | | |
| Outlet__ | Neg | | Neg | 0.035 | 0.046 |
| Feed____ | 0.168 | 0.069 | 0.003 | | |
| Outlet__ | Neg | | Neg | Traces | 0.063 |
| Feed____ | 0.120 | 0.049 | 0.003 | | |
| Outlet__ | Neg | | Neg | Neg | 0.054 |

Under the conditions prevailing in this experiment it is seen that up to 0.017% of sodium sulphide can be substantially completely oxidised.

Example 4

Two different samples of refinery effluent water were contacted with cupric chloride catalyst under different conditions as follows:

|  | Sample I | Sample II |
|---|---|---|
| Temperature, ° C | 130 | 115 |
| Pressure, lbs./sq. in | 58 | 43 |
| Air rate, m.³/h | 450 | 136 |
| Cu, p.p.m | 10 | 20 |

Results are shown in the following table:

| Sample | $Na_2S$, percent wt. S | RSH, percent wt. | $Na_2S_2O_3$, percent wt. | $Na_2SO_4$, percent wt. S | Residence, time/h. |
|---|---|---|---|---|---|
| I | | | | | |
| Inlet___ | 0.048 | 0.009 | neg | | 0.8 |
| Outlet__ | | Traces | neg | 0.055 | |
| II | | | | | |
| Inlet___ | 0.065 | 0.006 | neg | | 4.6 |
| Outlet__ | | neg | neg | 0.063 | |

It is seen that under the more severe conditions used to treat sample I, a shorter residue time is required for complete oxidation of sulphide.

Example 5

Refinery effluent water was treated (a) with 30 p.p.m. of ferric chloride catalyst and (b) without catalyst under under the following conditions:

Temperature _____ 119° C.
Pressure _____ 46 lbs./sq. in.
Air rate _____ 110 m.³/h.
Residence time _____ 4.6 hrs.

Results are indicated in the following table:

|  |  | NaOH, percent wt. | $Na_2S$, percent wt. | $Na_2S$, percent wt. S | $Na_2S_2O_3$, percent wt. S | $Na_2SO_4$, percent wt. S |
|---|---|---|---|---|---|---|
| No iron_____ | Inlet___ | 0.052 | 0.086 | 0.035 | | |
|  | Outlet__ | 0.068 | Neg | | 0.014 | 0.022 |
| 30 p.p.m. iron____ | Inlet___ | 0.055 | 0.076 | 0.031 | | |
|  | Outlet__ | 0.055 | Neg | | Traces | 0.030 |

The fact that some sulphate is formed in the absence of ferric chloride is attributed to the catalytic effect of iron hydroxide present in the plant.

Example 6

Water containing 0.025% wt. sodium thiosulphate and 0.5% wt. NaOH was treated with various catalysts under the following conditions:

Air rate _____ 30 l./h.
Temperature _____ 105° C.
Pressure _____ 58 lbs./sq. in.
Input _____ 1000 ml.

The rate of oxidation of thiosulphate to sulphate in each case is illustrated on the accompanying graph FIG. 1.

I claim:
1. A process for treating aqueous solutions to convert sulphides contained therein to sulphates which comprises contacting the solution with a free oxygen-containing gas at a temperature within the range of from about 95° C. to about 135° C. in the presence of a catalyst selected from the group consisting of ferrous salts, ferric salts and cupric salts.
2. A process as claimed in claim 1 wherein the free oxygen-containing gas is air.
3. A process as claimed in claim 1 wherein the catalyst is cupric chloride.
4. A process as claimed in claim 1 wherein the catalyst is ferrous chloride.
5. A process as claimed in claim 1 wherein the catalyst is ferric chloride.
6. A process as claimed in claim 1 wherein the catalyst is used in the form of an alkaline aqueous solution.
7. A process as claimed in claim 6 wherein the pH of the catalyst solution is between 7 and 9.
8. A process as claimed in claim 1 wherein the temperature is within the range 105–130° C. and the pressure within the range 0–50 p.s.i.g.
9. A process as claimed in claim 1 wherein the solution to be treated is contacted with between 1 and 5 times the stoichiometric quantity of oxygen required to oxidise the sulphide present to sulphate.

10. A process as claimed in claim 9 wherein the solution is contacted with between 3 and 4 times the stoichiometric quantity of oxygen.

11. A process as claimed in claim 1 wherein the catalyst is contacted with the solution to be treated at a rate sufficient to provide between 10 and 1000 parts of metal per million parts of solution.

12. A process as claimed in claim 11 wherein between 30 and 100 parts of metal are provided per million parts of solution.

13. A process as in claim 1 where the aqueous solution is a petroleum refinery effluent.

References Cited by the Examiner

UNITED STATES PATENTS

| 1,908,545 | 3/33 | Schwab et al. | 210—50 |
| 2,897,150 | 7/59 | Bencowitz | 210—63 |
| 3,029,202 | 4/62 | Brown | 210—63 |

OTHER REFERENCES

Mellor's Modern Inorganic Chemistry (edited by G. D. Parkes, in collaboration with J. W. Mellor), page 569. [Copy in Scientific Library. Revised and rewritten in 1939.]

MORRIS O. WOLK, *Primary Examiner.*